(12) United States Patent  
Lauper

(10) Patent No.: US 7,058,385 B2  
(45) Date of Patent: Jun. 6, 2006

(54) EMERGENCY CALL SYSTEM WITHIN A TELECOMMUNICATION NETWORK

(75) Inventor: Eric Lauper, Bern (CH)

(73) Assignee: Swisscom Mobile AG, Bern (CH)

( * ) Notice: Subject to any disclaimer, the term of this patent is extended or adjusted under 35 U.S.C. 154(b) by 397 days.

(21) Appl. No.: 10/082,835

(22) Filed: Feb. 25, 2002

(65) Prior Publication Data

US 2002/0086659 A1 Jul. 4, 2002

Related U.S. Application Data

(63) Continuation of application No. PCT/CH99/00401, filed on Aug. 30, 1999.

(51) Int. Cl.  
*H04M 11/04* (2006.01)

(52) U.S. Cl. ............... 455/404.1; 455/404.2; 455/414.1; 455/445; 455/456.1; 455/458; 455/521

(58) Field of Classification Search ............... None  
See application file for complete search history.

(56) References Cited

U.S. PATENT DOCUMENTS 5,479,482 A 12/1995 Grimes  
5,539,924 A 7/1996 Grube et al.  
5,630,209 A * 5/1997 Wizgall et al. ............ 455/521  
5,705,980 A * 1/1998 Shapiro ................ 340/539.11  
6,028,537 A * 2/2000 Suman et al. .............. 340/988  
6,061,561 A * 5/2000 Alanara et al. .......... 455/456.1  
6,073,004 A * 6/2000 Balachandran ........... 455/404.2  
6,078,804 A * 6/2000 Alperovich et al. ..... 455/404.1  
6,141,563 A * 10/2000 Miller et al. ............... 455/558  
6,334,059 B1* 12/2001 Stilp et al. .............. 455/404.2  
6,360,092 B1* 3/2002 Carrara .................... 455/410  
6,397,054 B1* 5/2002 Hoirup et al. .......... 455/404.1  
6,408,172 B1* 6/2002 Alperovich et al. ..... 455/404.1  
6,466,804 B1* 10/2002 Pecen et al. ............... 455/558

FOREIGN PATENT DOCUMENTS

| GB | 2 250 400 A | 6/1992 |
|---|---|---|
| WO | WO 97/21314 | 6/1997 |
| WO | WO 97/23104 | 6/1997 |
| WO | WO 98/08350 | 2/1998 |
| WO | WO 98/31168 | 7/1998 |

* cited by examiner

*Primary Examiner*—Temica Beamer  
(74) *Attorney, Agent, or Firm*—Pearne & Gordon LLP

(57) ABSTRACT

Method for distributing an emergency call message within a mobile telecommunication network. The emergency call message generated by a mobile user is automatically sent first to mobile devices in the vicinity of the mobile user. Only then is it distributed to terminals, predefined by said user, in said telecommunication network.

Advantage: is based on solidarity.

45 Claims, 1 Drawing Sheet

EMERGENCY CALL SYSTEM WITHIN A TELECOMMUNICATION NETWORK

This application is a continuation of international application PCT/CH99/00401 filed on Aug. 30, 1999.

FIELD OF THE INVENTION

The present invention concerns an emergency call system that can be used within a telecommunication network.

RELATED ART

Patent application GB-A-2250400 (D. Brown McDougall) describes a system for automatically communicating in an emergency a predefined message to a predefined telephone number list in a predetermined sequence. This system is suited for example in the case of burglary or fire for calling first selected neighbors and then the police or the fire brigade. Fast assistance from various partners can thus be achieved.

Such a system is however hardly suitable for giving assistance to mobile users in an emergency, since the called partners cannot know where the calling mobile user is currently located and where help is needed.

It is an aim of the invention to propose a method for distributing emergency call messages that is better suited for mobile users.

Patent application WO98/31168 describes a system for automatically determining the location of a mobile user notifying a central of an emergency. Further emergency call messages from other mobile users in the vicinity are then no longer forwarded directly to the central in order not to overload it. The mobile user in an emergency can however not expect very fast assistance from this system, since the emergency call message is forwarded only to a generally distant central.

It is another aim of the invention to propose a method with which mobile users in an emergency can receive faster assistance.

It is another aim of the invention to propose a method with which emergency call messages can be distributed fast and without high connection costs to better selected terminals.

BRIEF SUMMARY OF THE INVENTION

According to the present invention, these aims are achieved in particular through the characteristics of the independent claims. Further advantageous embodiments are moreover described in the dependent claims and in the description.

In particular, these aims are achieved in that an emergency call message generated by a mobile user is automatically sent first to mobile devices in the vicinity of the mobile user, and then distributed to terminals, predefined by said user, in the telecommunication network.

This has the advantage that the emergency call message is first sent to mobile users in the immediate vicinity of the mobile user and who can thus give the fastest assistance. Only later is the emergency call message (possibly) distributed to other terminals predefined by the mobile user, for example to his family, to friends, to the police, etc.

In a preferred embodiment of the invention, the emergency call message is sent as SMS (Short Message System) or USSD (Unstructured Supplementary Services Data) message. This has the advantage that an emergency call message can be sent free of charge or at a low cost almost simultaneously to many users, even when the user may telephone only up to a certain amount, for example in the case of a prepaid card.

In a preferred embodiment of the invention, the emergency call message is distributed to terminals located progressively further away from the mobile user. This has the advantage that more distant users are only disturbed if no closer user has reacted.

In a preferred embodiment of the invention, the emergency call message contains characteristics that enable a faster identification of this user and/or a faster and better help. For example, a description of the mobile user and/or of his vehicle and/or medical features such as blood group, and/or images etc. can be contained in the emergency call message. Preferably, these characteristics are stored in the mobile device, for example in the identification module of the user, and transmitted automatically when an emergency call message is generated. This has the advantage that the mobile user does not have to enter these useful indications himself during an emergency.

In a variant embodiment, the emergency call message contains only a pointer to a memory area in the mobile device or in a server, where these characteristics are stored. In this manner, a mobile user who receives an emergency call message can obtain these characteristics himself if he needs them.

DESCRIPTION OF THE DRAWINGS

Hereafter, various embodiments of the invention will be described in more detail with the aid of the attached single FIGURE. The FIGURE shows diagrammatically a system in which an emergency call message is distributed.

DETAILED DESCRIPTION OF THE INVENTION

Figure 1:
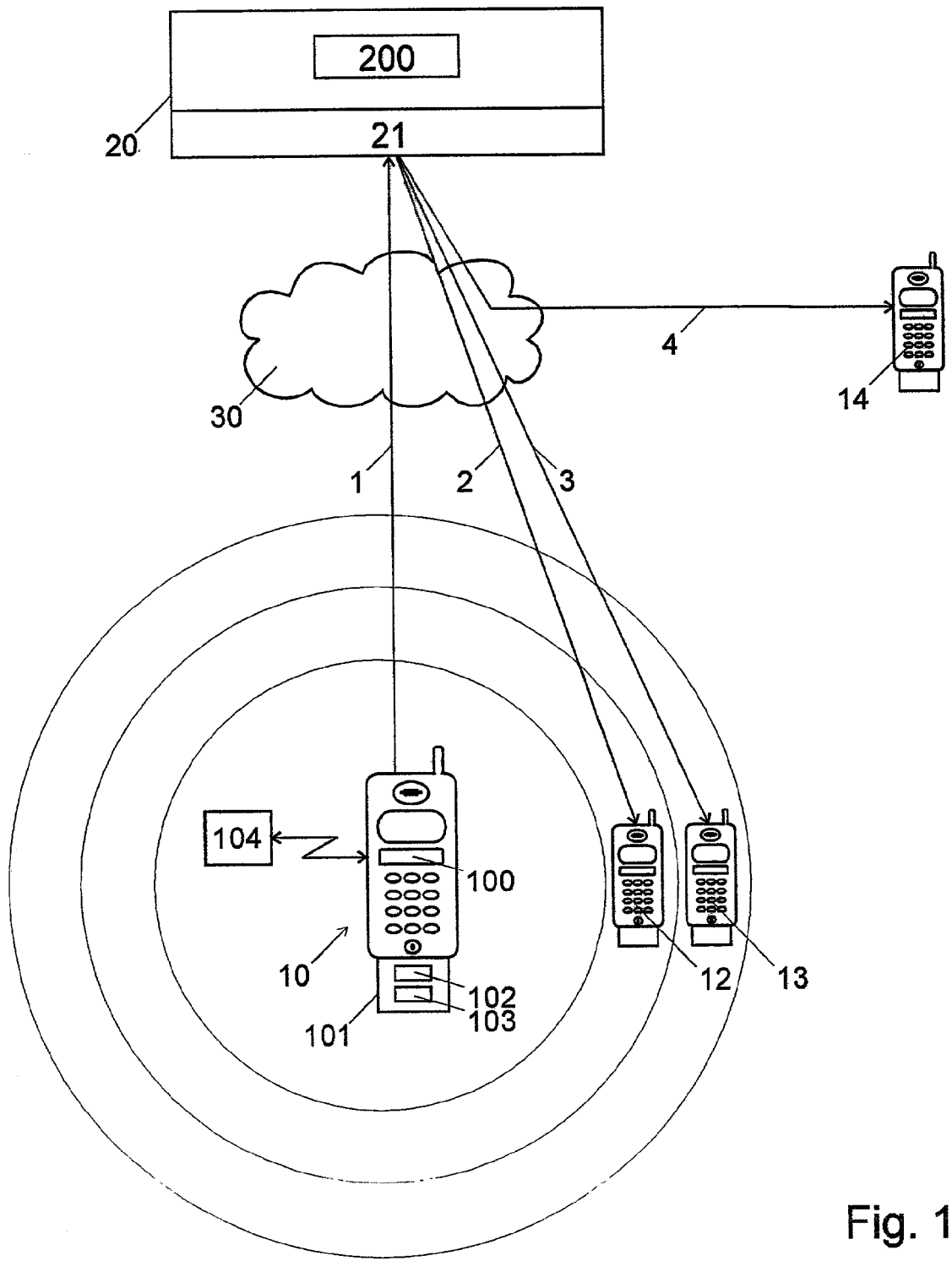

Although this invention describes in detail the special case of the invention being applied in a GSM mobile radio network 30, the one skilled in the art will understand that this method can also be used with other types of cellular mobile radio networks, for example with AMPS, TDMA, CDMA, TACS, PDC, HCSCD, GPRS, EDGE or UMTS networks.

Reference number 10 shows the mobile terminal of a mobile user finding himself in an emergency. Other mobile terminals in the same mobile radio network 30 bear the reference numbers 12 and 13. The mobile terminals 10, 12, 13 can for example be mobile telephones, media telephones, laptops, palmtops or computers with a mobile telecommunication interface. The terminal 10 has an identification module 101, for example a SIM (Subscriber Identification Module) card, with various memory areas 102, 103 preferably integrated in the same chip. In a preferred embodiment, the terminal 10 additionally has a control element 100 in order to generate very quickly an emergency call message. The control element 100 can be for example a button, or a GUI (Graphical User Interface) element displayed on the screen of the terminal, for example an icon, a menu title, etc.

In a variant embodiment, the terminal 10 can additionally be connected with an emergency call detector 104 or be integrated in such a detector respectively contain such a detector. The detector 104 can automatically determine certain emergency situations and request the mobile device 10 to send an emergency call message. Depending on the application, the detector 104 can for example determine burglaries, for example in houses or cars, offences against property, fire, loss of consciousness, accidents, traffic congestion on the highway, etc. The detector 104 can for example be an impact shock detector, for example with an acceleration measuring device.

The reference number 14 shows a terminal that can also be reached from the mobile network 30. The terminal 14 can for example be a telephone connected to a fixed network, a facsimile machine, a PC, a mobile device, etc. In this invention, the terminal 14 is used by a user whom the mobile user 10 wishes to inform in the case of emergencies. The terminal 14 can for example be used by family, friends, by the police, the fire brigade, a hospital, etc.

The number 20 represents a fixed device in the mobile radio network 30. Depending on the embodiment and on the mobile radio network, the device 20 can be part of a fixed station system, for example a base station, a mobile switching center, for example a MSC (Mobile Switching Service Center), a server in the network, or a combination of these components. The device 20 contains a location-determining system 21, or can access such a system. The device 20 additionally includes a memory area 200 in which a software program is stored that can be executed by appropriate data processing means.

If the user of the mobile device 10 wants to generate an emergency call message, he preferably needs to operate only the control element 100. In a variant embodiment, an emergency call message can automatically be generated on the initiative of the detector 104. In another embodiment, the mobile user generates an emergency call message by manually entering a text and sending it as SMS, USSD, GPRS, etc. to a predefined address. In a further embodiment, the mobile user can send an emergency call message by selecting a predefined emergency call number and thus connecting with the server 20 that recognizes the identity of the caller and forwards the emergency call message.

In the memory area 102 of the mobile device, for example in the identification module 101, at least one characteristic of the mobile user is stored. This or these characteristics can for example allow a faster identification of the mobile user and/or a faster and more efficient help. In a first variant embodiment, these characteristics have been entered and stored by said mobile user himself. In another variant embodiment, they have been downloaded by a third party, for example by the network operator and/or by a service provider, for example a doctor or an insurance company, over the network 30, for example on the basis of the SICAP method described in patent EP0689368. In yet another variant embodiment, they have been downloaded from an external device over a contactless interface at close range, for example over a BlueTooth or IrdA interface. Various characteristics in the same memory area 102 can also be loaded over various channels in the memory area 102.

Depending on the application and on the wish of the mobile user 10, the characteristics stored in the memory area 102 can comprise for example among others the mobile user's name, his blood group, his gender, his hair color, his age, his car type, color and plate number, etc. In a variant embodiment, these characteristics can also include an image of the mobile user and/or of his car. These characteristics are then linked with the emergency call message. In a variant embodiment, the emergency call message contains only a pointer, for example a URL address, to these characteristics; users who receive the emergency call message can then with this pointer access the required characteristics. In this case, at least certain characteristics are stored in a server rather than in the mobile device.

As already mentioned, and depending on the mobile radio network 30, the emergency call message can be transmitted, as SMS or USSD message, as GPRS packet, as e-mail, for example within a WAP (Wireless Application Protocol) system, etc. Preferably, a free or at least inexpensive mode of transmission is used, so that an emergency call message can even be sent to many users if the prepaid credit of the mobile user is exhausted or nearly exhausted. Facsimile messages or spoken messages, preferably messages generated with a voice synthesizer, can however also be used in the framework of this invention.

Preferably, the identification card 101 of the mobile user is programmed to also send costly emergency call messages when the mobile user's credit has been completely exhausted. Such an identification card is described in utility patent DE-U-29800711.8.

The personal identification module 101 preferably contains an electronic certificate with which emergency call messages can be signed electronically, so that each recipient 20, 12, 13, 14 can verify the sender's identity. Additionally, at least certain confidential data in the emergency call message are preferably encrypted electronically so that only authorized recipients can decrypt these confidential data. For example, medical characteristics of the user are encrypted with a public key so that only authorized doctors who have the matching private key can access these data.

The emergency call message sent by the user 10 is sent over the mobile radio network 30 to the device 20 (arrow 1), that possibly completes this message, for example with additional user characteristics, and forwards it first to other mobile devices 12, 13 in the vicinity of the mobile user 10 (arrow 2). The emergency call message can also be converted in the device 20 into a message of another type. For example, a SMS message can be converted into an e-mail, a fax or a voice message generated with a voice synthesizer. It is also possible to carry out several type-conversions of the same message, so that the emergency call message can be distributed to as many terminals 12, 13, 14 of different types as possible.

In a first variant embodiment of the invention, the emergency call message is sent simultaneously to all mobile devices 12, 13 that use the same base station as said mobile user 10.

In another variant embodiment of the invention, the position of the calling mobile user 10 is determined by the location-determining system 21. The location-determining system 21 can determine this position for example from trigonometric computations of signals from a plurality of base stations. The user's position can however also be determined by the mobile device 10, for example with a GPS (Global Positioning System) receiver, and be communicated to the system 21 as part of the emergency call message 1. The emergency call message is first distributed on the basis of the position indication determined by the location-determining system 21 to all mobile users 10, 12, 13 in the vicinity. For example, the emergency call message can be directed first only to the mobile devices 12 that are close to the mobile user 11, and then only in a further step distributed to the more distant devices 13. In this manner, the emergency call message is distributed to mobile devices 12, 13 that are progressively further away from the mobile user.

The user of a mobile device 12 or 13 that has received the emergency call message can send a confirmation to the mobile user 10 and/or to the device 20 and thus declare his readiness to give assistance. The emergency call message is preferably only distributed any further until a mobile device 12, 13 has dispatched such a confirmation. Depending on the embodiment and on the kind of emergency message, the message can be distributed until for example a doctor or policeman identified as such has declared his readiness.

When all active users within a defined area, for example within a cell in the mobile radio network 30, have been reached without success, the geographic distribution of the emergency call message is interrupted. According to the invention, the emergency call message is then sent to terminals 14 predefined by said user 10.

For this purpose, the mobile user 10 can define a list of terminals 14 to which unanswered emergency messages must be addressed. This list can comprise for example the telephone numbers or e-mail addresses of friends, of the family doctor, of the police, etc. Preferably, the emergency call address list is stored in a memory area 103 of the mobile device 10, for example in the identification module 101. The list can for example consist of a subset of the personal phone number directory stored in the identification module 101. In a variant embodiment, the emergency call address list is however rather stored in a memory area accessible from a mobile switching center (MSC) in the telecommunication network 30, for example in the home data (HLR). The list is preferably encrypted so that only authorized persons can have access to it.

The emergency call messages can be forwarded to all the terminals in the list (arrow 4). In a variant embodiment, the mobile user can organize the terminals 14 in the list hierarchically. The emergency call message is in this case first sent to terminals having the highest level in this hierarchy and progressively to terminals on lower levels. The distribution stops for example when a called user 14 answers or sends a confirmation.

The mobile user 11 can preferably himself define which addresses he wants to enter in said emergency call address list 103. New addresses can for example be entered with input means of the mobile device, over the Internet and/or over an external device at close range connected with the mobile device 11 over a contactless interface. Preferably, authorized external third parties can enter addresses in the emergency call address list 103, for example selected doctors, car repair firms, etc. This list can also be updated and/or completed dynamically, for example according to the current location of the mobile user 11.

In the framework of this invention, it is also possible to store in a single terminal several emergency call address lists 103 that can correspond to different emergency situations. For example, a car driver can define that in the case of a congestion on the highway, first the neighboring cars and then the police must be informed, whilst in the case of an accident, also the family and the family doctor must receive an emergency message. Time-and location-dependent emergency call address lists can also be defined in the framework of this invention.

Addresses in the emergency call address list can preferably correspond to different types of terminals that can be reached through various other networks. For example, the addresses defined by the user can correspond to other mobile devices, for example GSM mobile telephones, fixed network devices, e-mail addresses and/or fax recipients. In this case, a conversion of the message type takes place in the system part 20.

If the mobile user 11 who has sent an emergency call message 1 continues moving, his location is preferably further monitored by the location-determining system 21. The emergency call message in this case is distributed to other mobile devices in the new vicinity of the mobile user. Thus, the distribution area of the emergency call message automatically follows the moving mobile user. This characteristic can for example be useful in the case of abduction or offences against property.

The invention claimed is:

1. A method for using a mobile communication device used by a mobile user within a telecommunication network for distributing an emergency call message within said telecommunication network, said method comprising the steps of:
    determining a first set comprising one or more terminals;
    determining a second set comprising one or more terminals;
    generating an emergency call message to the terminals of said first set;
    wherein, if no terminal of said first set acknowledges said emergency call message, then automatically sending said emergency call message to said terminals of said second set, wherein
    said terminals of one of said first set and said second set are mobile devices part of the communication network that are in a vicinity closest to said mobile user, and further wherein
    said terminals of the other of said first set and said second set are terminals predefined by said user.

2. The method of claim 1, wherein the mobile user generates an emergency call message by using a single control element of his mobile device.

3. The method of claim 1, wherein the emergency call message is automatically generated by an emergency call detector.

4. The method of claim 1, wherein the emergency call message contains at least a stored characteristic of said mobile user or a pointer to such a characteristic.

5. The method of claim 4, wherein said at least one characteristic is stored in a memory area of an identification module of the mobile user.

6. The method of claim 4, wherein said at least one characteristic is stored by said mobile user.

7. The method of claim 4, wherein said at least one characteristic is downloaded by a third party.

8. The method of claim 7, wherein said at least one characteristic is downloaded over said telecommunication network.

9. The method of claim 7, wherein said at least one characteristic is downloaded over a contactless interface at close range.

10. The method of claim 4, wherein said at least one characteristic comprises the name of said mobile user.

11. The method of claim 4, wherein said at least one characteristic comprises the blood group of said mobile user.

12. The method of claim 4, wherein said at least one characteristic comprises the gender of said mobile user.

13. The method of claim 4, wherein said at least one characteristic comprises the hair color of said mobile user.

14. The method of claim 4, wherein said at least one characteristic comprises the age of said mobile user.

15. The method of claim 4, wherein said at least one characteristic comprises the car type of said mobile user.

16. The method of claim 4, wherein said at least one characteristic comprises the car color of said mobile user.

17. The method of claim 4, wherein said at least one characteristic comprises the car plate number of said mobile user.

18. The method of claim 4, wherein said at least one characteristic comprises a picture of said mobile user.

19. The method of claim 1, wherein said emergency call message is sent as SMS message.

20. The method of claim 1, wherein said emergency call message is sent as USSD message.

21. The method of claim 1, wherein said emergency call message is sent as GPRS packet.

22. The method of claim 1, wherein said emergency call message is sent as e-mail.

23. The method of claim 1, wherein said emergency call messages are signed electronically.

24. The method of claim 1, wherein part of said emergency call messages is encrypted electronically.

25. The method of claim 1, wherein said first set or said second set includes all mobile devices using the same base station as said mobile user.

26. The method of claim 1, wherein the position of said mobile devices within a cell of the telecommunication network is determined through a location-determining system in said telecommunication network and wherein the emergency call message is distributed first on the basis of this position indication to other mobile devices in the vicinity.

27. The method of claim 26, wherein the emergency call message is distributed to mobile devices that are progressively further away from the mobile user.

28. The method of claim 27, wherein the emergency call message is distributed any further until a mobile device has dispatched a confirmation.

29. The method of claim 27, wherein the emergency call message is forwarded to the terminals predefined by said user only when all active users within a defined area have been reached.

30. The method of claim 1, wherein said terminals predefined by the mobile user are listed hierarchically and wherein the emergency call message is distributed progressively to all levels of this hierarchy.

31. The method of claim 1, wherein said terminals predefined by the mobile user are stored in an identification module of the mobile user.

32. The method of claim 1, wherein said terminals predefined by the mobile user are stored in a memory area accessible from a mobile switching center (MSC) in the telecommunication network.

33. The method of claim 1, wherein the location of said mobile user is also monitored after said emergency call message has been sent, and wherein said emergency call message is forwarded to other mobile devices in a new vicinity of the mobile user if this location changes.

34. The method of claim 1, wherein at least one reached mobile device dispatches a confirmation to an address indicated in said emergency call message.

35. The method of claim 1, wherein at least one reached mobile device dispatches a confirmation to said mobile user.

36. The method of claim 1, wherein said emergency call message is completed by a fixed device in said telecommunication network.

37. An identification module for a mobile terminal for performing the method of claim 1, wherein it has a memory area for at least one characteristic of the mobile user, this characteristic being used only for emergency call messages, as well as a memory area for a list of terminals predefined by the mobile user and to which emergency call messages must be sent.

38. The identification module of claim 37, wherein it contains an electronic certificate with which emergency call messages can be signed.

39. A device in a mobile radio network for performing the method of claim 1 that has a location determining system for determining the position of mobile devices within at least one area of said telecommunication network, wherein it has a memory area loaded with a software program for recognizing an emergency call message from a mobile user in said area, and for distributing this emergency call message first to mobile devices in the vicinity of the mobile user and then to terminals, predefined by said user, in the telecommunication network.

40. A method for using a mobile communication device used by a user within a telecommunication network for distributing an emergency call message within the telecommunication network, said method comprising the steps of:
 allowing the user to communicate with other users in non-emergency situations;
 generating an emergency call message in an emergency;
 automatically sending the emergency call message first to one or more arbitrary mobile devices in a vicinity closest to the mobile user; and then
 distributing the emergency call message to terminals predefined by said user.

41. The method of claim 40, wherein at least one characteristic of the user other than the user's identity is stored in a memory area of an identification module included in the mobile communication device.

42. A method for using a mobile communication device used by a user within a telecommunication network for distributing an emergency call message within the telecommunication network, said method comprising the steps of:
 providing a user with a means for communicating with other users in non-emergency situations;
 generating an emergency call message in an emergency;
 sending the emergency call message first to one or more arbitrary mobile devices in a vicinity closest to the mobile user; and then
 optionally sending the emergency call message to one or more arbitrary mobile devices in a vicinity less close to the mobile user than the arbitrary mobile devices in the vicinity closest to the mobile user; and
 optionally distributing the emergency call message to terminals predefined by said user.

43. The method of claim 42, wherein at least one characteristic of the user other than the user's identity is stored in a memory area of an identification module included in the mobile communication device.

44. A method for using a mobile communication device used by a user within a telecommunication network for distributing an emergency call message within the telecommunication network, said method comprising the steps of:
 generating an emergency call message in an emergency;
 automatically sending the emergency call message first to one or more arbitrary mobile devices part of the communication network that are geographically closest to the mobile user; and then
 distributing the emergency call message to terminals predefined by said user.

45. The method of claim 44, wherein at least one characteristic of the user other than the user's identity is stored in a memory area of an identification module included in the mobile communication device.

* * * * *